Aug. 19, 1952     J. J. NELSON     2,607,604
DRAFT FASTENER

Filed July 20, 1948

INVENTOR.
JOHN J. NELSON
BY

Patented Aug. 19, 1952

2,607,604

UNITED STATES PATENT OFFICE 2,607,604

DRAFT FASTENER

John J. Nelson, Alameda, Calif.

Application July 20, 1948, Serial No. 39,602

1 Claim. (Cl. 280—33.15)

The invention relates to devices for detachably coupling the draft tongue or the like of a vehicle to be towed to the rear of a towing vehicle.

An object of the present invention is to provide a draft fastener of the character described which is adapted for mounting at the rear of a towing vehicle and which will afford a simple, easy and quick attachment and detachment of the draft tongue or the like of the vehicle to be towed.

Another object of the invention is to provide a draft fastener of the character above which will afford an improved universal coupling for the eye of a draft tongue of a vehicle to be towed insuring proper support for the eye upon reverse movement of the vehicles or upon an overrunning of the towed vehicle, and which upon attachment of the eye will be automatically self-locking to prevent accidental release or uncoupling thereof.

A further object of the invention is to provide a coupling device of the character described which is composed of a minimum number of sturdily formed parts mounted and constructed to withstand rigorous use and in a manner affording safe and foolproof operation throughout a long period of time.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing.

Figure 1:
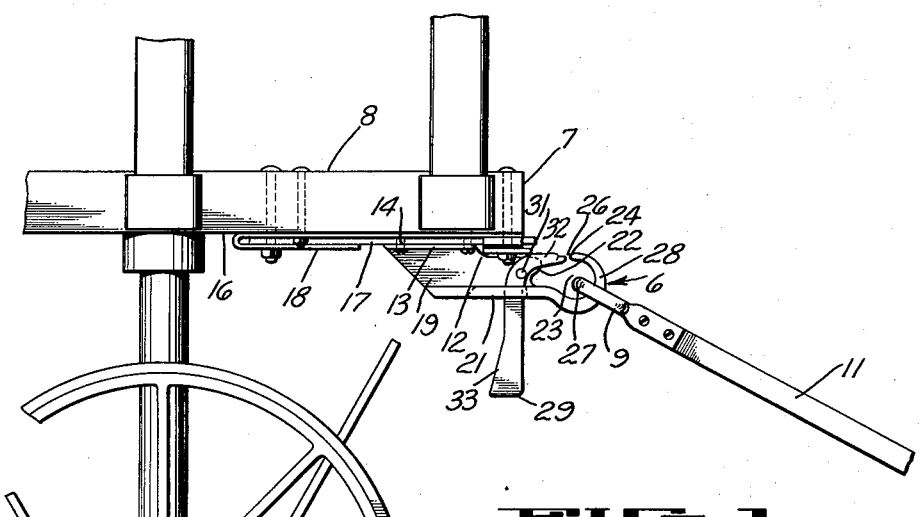
Figure 1 is a side elevation of a draft fastener constructed in accordance with the present invention and shown operatively connected to the rear of a towing vehicle, illustrated in part.

The draft fastener of the present invention, generally denoted by numeral 6 in the accompanying drawing, is shown mounted on the rear 7 of the load platform 8 of a towing vehicle, illustrated only in part, for the attachment of the eye 9 of a draft tongue 11 of a vehicle to be towed (not shown). The coupling device has been particularly designed for use with what are sometimes called "Mary Ann" wagons most commonly employed in and around railroad stations for hauling of baggage and cargo to and from trains although as will be understood the device may be used for coupling other types of vehicles having similar towing characteristics and where the improved features of the device may be desired to be used.

The main body 12 of the fastener is preferably formed of a casting of either steel or malleable iron and is here provided with a top flange 13 perforated as at 14 for bolting or otherwise securing to the underside 16 of the load platform 8 adjacent the rear 7 thereof. Preferably, the flange 13 is secured to a swivel lever 17 carried in a supporting bracket 18 fixed to the underside 16 of the load platform so as to afford the body 12 a limited horizontal swinging motion to either side of the line of movement of the vehicle. The swivel connection for the member 12 and the details of construction of the lever 17 and its supporting bracket 18 are more fully illustrated, described and claimed in my co-pending application for tow hitch, which application is hereby incorporated by reference for such portions thereof as are required for disclosure purposes in connection with the general type of use of and mounting for the draft fastener of the present invention.

Figure 2:
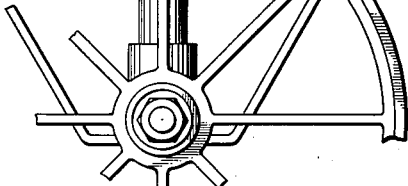
Figure 2 is a side elevation similar to Figure 1 but on a somewhat enlarged scale.
Figure 2:
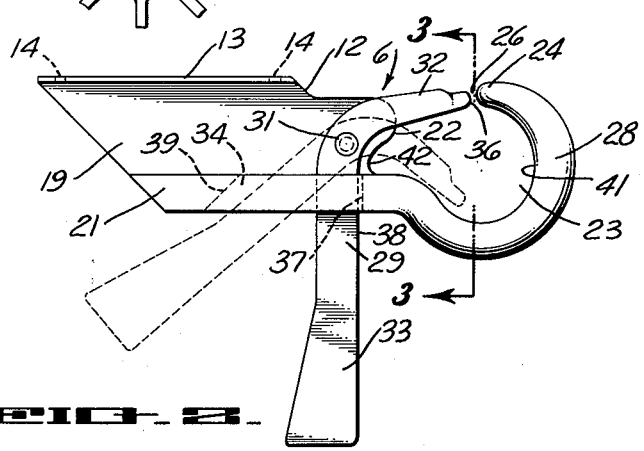
Figure 3:
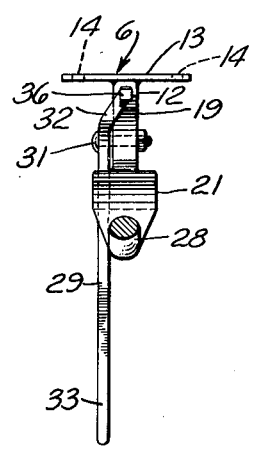
Figure 3 is a cross-sectional view of the draft fastener taken substantially on the plane of line 3—3 of Figure 2.

A second flange 19 is formed integrally with the top flange 13 in generally depending relation thereto and is provided at its lower end with a transverse flange 21 having its greatest dimension generally parallel to flange 13. The lower flange 21 is extended forwardly of an end 22 of flange 19 and is curved to define a hook shaped enclosure 23 terminating in an end 24 of the flange spaced from the end 22 of flange 19 so as to provide an opening 26 to the enclosure for admitting thereto of the closed end 27 of the draft eye 9, thereby positioning the eye in encompassing relation to the forward curved extension 28 of flange 21 providing the hook portion of the device. A lever 29 is pivotally connected, as by means of pivot pin 31, intermediate its ends 32 and 33 to the vertical flange 19, the pin 31 providing a substantially horizontal axis of rotation for the lever permitting it to swing in a vertical plane parallel to the plane of the hook enclosure 23. The greater mass of the lever is arranged at the end 33 of its pivotal connection whereby this end will assume a normal position of rest in a substantially vertical depending position from pin 31, as illustrated in Figures 1, 2 and 3 of the drawing.

Figure 4:
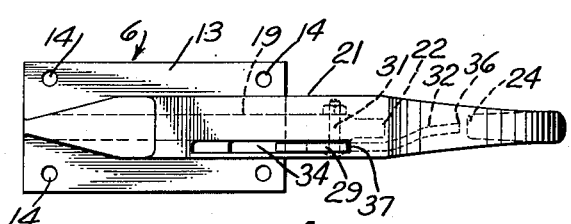
Figure 4 is a bottom view of the draft fastener.

Preferably, the lower flange 21 is formed with an elongated slot 34 therein below the pivotal pin 31 for admitting therethrough the downward extending end 33 of the lever. The opposite end 32 of the lever is extended generally horizontally from the vertical connection 31 so as to extend across the opening 26 of the hook enclosure and into closely spaced relation to the end 24 of the flange extension 28. As will be seen from Figures 2, 3 and 4, the end 32 of the lever is bent transversely from the pivot pin 31 so as to position the end face 36 thereof in substantially coplaner relation to the end 24 of the hook extension.

As will be understood from the foregoing, the normal position of rest of end 32 of the lever is across the opening 26 of the hook so as to substantially close the hook enclosure 23. The lever end 32, however, by reason of the pivotal connection 31 is permitted to swing downwardly and into the enclosure 23, as illustrated in dotted lines in Figure 2 so as to admit the draft eye 9, as above described. In this downward displacement of the lever end 32, the center of gravity of the heavier end 33 of the lever is elevated so that upon release of the end 32 from its depressed position, the lever will again automatically assume its position of rest with the end 32 across the open side of the hook. Outward movement of the end 32, with respect to the hook enclosure 23 is prevented so as to lock upon the hook a draft eye which has been positioned therein. This action is provided by the forward end 37 of the slot which serves as a stop engageable with the forward side 38 of the lever end 33 to prevent movement from its rest position in a counter-clockwise direction, as illustrated in Figure 2. The opposite end 39 of the slot is removed by distance from end 37 sufficient to permit a swinging of the lever in a clockwise direction with reference to Figure 2, enabling the end 32 to be depressed to the bottom of the hook enclosure 23. To attach the draft eye 9 to the hook it is only necessary to press the closed end 27 of the eye downwardly against the lever end 32 to thereby depress the latter by a distance sufficient to gain admission of the eye end 27 into the hook enclosure 23. Upon drawing the eye end 27 against the forward interior wall 41 of the hook enclosure, the lever end 32 will automatically swing upwardly, as above described, to lock the eye upon the hook. Detachment of the hook may be readily effected by manually engaging and swinging the lower end 33 of the lever away from its rest position so as to lower lever end 32 into the enclosure, away from the opening 26, to thereby enable the movement of the eye from the free end 24 of the hook.

As an important feature of the invention, the hook enclosure is formed in a manner affording an improved support for the draft eye 9 upon backing up of the coupled vehicles or overrunning of the towed vehicle which cause in either instance a relative movement of the eye 9 in the enclosure rearwardly thereof to against the forward end 22 of the flange 19. To properly support the closed end 27 of the eye in this position, the flange end 22 is formed with a socket recess 42 opening generally horizontally into the enclosure 23 and formed to receive and anchor within the recess, the closed end 27 of the eye. As will be seen from Figure 2 the recess 42 is located approximately centrally of the height of the enclosure and the walls of the enclosure, including lever end 32, generally converge in the direction of the recess 42 so as to guide the closed end 27 of the eye into proper journalled position within the recess upon backing up of the vehicles or an overrunning of the vehicle being towed.

I claim:

A draft fastener comprising, a body formed with a top flange adapted for securing to the underside of a load platform of a tow vehicle at the rear thereof, a second flange depending from said first flange in a plane substantially perpendicular thereto, a third flange extending transversely from the bottom of said second flange and cooperating with said second flange to provide a curved wall defining a hook shaped enclosure arranged in a substantially vertical plane and terminating in an end spaced from an end of said second flange to provide an opening to said enclosure for admitting an eye of a draft tongue or the like said third flange having an elongated slot formed therein, and a lever having a pivotal connection intermediate its ends to said second flange about a horizontal axis to swing in a plane parallel to the plane of said enclosure and having its greater mass on one end of said connection depending therefrom through said slot and normally gravitating to a vertical position of rest of said lever end, the opposite end of said lever extending generally horizontally from said pivotal connection across said hook opening to adjacent said end of said third flange end, one end of said slot being positioned to engage said first lever end in the rest position thereof so as to prevent the elevation of said second lever end from its said position in a direction away from said enclosure while permitting movement of said lever in an opposite direction displacing said second lever end into said enclosure, said second flange end being formed with a socket recess opening substantially horizontally into said enclosure and formed for receipt and support of said eye upon relative forward movement thereof in said enclosure.

JOHN J. NELSON.

REFERENCES CITED

The following references are of record in the file of this patent:

UNITED STATES PATENTS

| Number | Name | Date |
|---|---|---|
| 738,953 | Stoekle | Sept. 15, 1903 |
| 1,829,959 | Lindaas | Nov. 3, 1931 |
| 2,349,021 | Truesdale et al. | May 16, 1944 |

FOREIGN PATENTS

| Number | Country | Date |
|---|---|---|
| 99,080 | Sweden | June 4, 1940 |